March 14, 1961 R. K. ORTHUBER ET AL 2,974,369

METHOD OF MAKING DISPLAY AMPLIFIER

Filed June 17, 1953

INVENTORS.
RICHARD K. ORTHUBER
CYRIL L. DAY
BY
Lockwood, Galt, Woodard, & Smith
ATTORNEYS 2,974,369

METHOD OF MAKING DISPLAY AMPLIFIER

Richard K. Orthuber, Fort Wayne, and Cyril L. Day, Huntington, Ind., assignors to International Telephone and Telegraph Corporation, a corporation of Maryland Filed June 17, 1953, Ser. No. 362,201

4 Claims. (Cl. 18—47.5)

The present invention relates to a display-amplifying device, and more particularly to a device for reproducing and amplifying an optical image. As will become apparent from the following description, this invention is not limited to radiation within the visible range, but finds particular utility in the reproduction of visible radiation. The invention will, therefore, be considered primarily in connection with the reproduction and amplification of optical images.

In Orthuber continuation-in-part application Serial No. 332,733, filed January 22, 1953, a display-amplifying device of the type contemplated by this invention is disclosed and claimed. This light-amplifying device was embodied in a laminated cell construction in which the laminae, for all practical purposes, were arranged in the manner of an ordinary parallel plate condenser having a dielectric material interposed between the two plates. The laminae constituting the plates of the condenser were composed of electrically conductive materials, such as metal, these plates being in such thin films as to be transparent. The dielectric was comprised of two parts; viz., a lamina of photo-conductive material, such as cadmium sulphide, having high-dark electrical resistivity and a lamina of electro-luminescent material which may be excited to luminescence by the application thereto of a variable electric field. A typical suitable material for this electroluminescent lamina is a copper activated zinc oxide and zinc sulphide mixture as explained by Destriau in the 1947 edition, volume 38 of Philosophical Magazine, on pages 700 to 739, 774 to 793, and 800 to 887. Other suitable materials are also described in these pages.

Such an amplifier cell has particular utility in the reproduction of television and motion picture displays. This cell provides amplification of the image projected upon it, whereby an image of low brightness produced by a relatively small television picture tube may be magnified many times and reproduced in highly brightened condition for clear observation.

The reproduction characteristics of this amplifying screen are determined in part by the photo-conductive lamina, so by varying certain construction features of this lamina, differing characteristics may be achieved.

In view of the foregoing, it is an object of this invention to provide a photo-conductive lamina for an amplifying screen, which is of such character as will conduce to the reproduction of an image in relatively high definition form. It is another object of this invention to provide a method for fabricating such a photo-conductive lamination.

It is a further object of this invention to provide a photo-conductive lamination composed of spaced particles of predetermined size and elongated shape oriented in a predetermined manner to achieve the desired end reproduction qualities.

It is a further object of this invention to provide a photo-conductive, sheet-like lamination or layer which possesses relatively low electrical capacity and relatively high electrical dark-resistance and capacitive reactance. As a corollary, it is another object to provide such a layer which possesses uniform, physical and electrical characteristics throughout its extent for the faithful reproduction of a radiation-image.

It is a still further object of this invention to provide an amplifying screen which will reproduce a radiation-image with a relatively high degree of definition. In other words, the object is to provide a screen which will reliably and consistently reproduce the elemental parts of a radiation-image without blurring or diffusion. It is a still further object of this invention to provide a light-amplifying screen of laminated construction which is capable of reproducing faithfully a radiation-image projected thereon.

It is another object to provide a method for producing the arrangements of the foregoing objects.

In accordance with the present invention, there is provided a photo-sensitive sheet-like element comprising a film of insulating material and a plurality of elongated photo-sensitive particles of predetermined size carried by this film, with the particles being arranged transversely of the film. In one specific arrangement of the invention, cadmium sulphide crystals of predetermined size and shape may be used as the aforementioned particles.

The method of this invention comprehends the use of an electrostatic field which is applied between two parallel, spaced planar electrodes, and steps which comprise applying a uniform film of sticky substance to one inner surface of one electrode, introducing a quantity of elongated radiation-sensitive cadmium sulphide crystals of predetermined size into the space between said electrodes, applying said electrostatic field between said electrodes for aligning said particles in a common direction substantially normal to the plane of the film and for causing the crystals to embed in the film, and thereafter securing the crystals in position.

For a better understanding of the invention, together with other and further objects thereof, reference is made to the following description, taken in connection with the accompanying drawings, the scope of the invention being defined by the appended claims.

Figure 4:
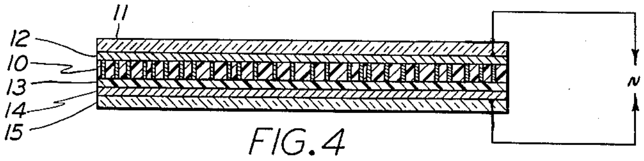
Figure 4 is a cross-sectional view of a light-amplifying screen of this invention.

While the drawings and the following description disclose planar, sheet-like elements for the various parts of the light amplifying screen, it should be understood that such elements may be formed into any desired shape or size as is necessary to meet design requirements. By way of example, the screen shown in Figure 4 is flat, but could equally as well be formed convexly in cross section.

Figure 1:
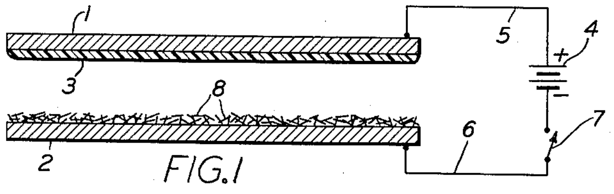
Figure 1 is a sectional, diagrammatic illustration of one step in the method of this invention.

Referring to the drawings, and more particularly to Figure 1, two parallel, conductive plates serving as electrodes 1 and 2 are spaced apart a particular distance as will become apparent from the following description. A sticky substance, such as conventional cellulose acetate or suitable wax, is applied as a film 3 to the underside of the electrode 1 to a suitable thickness. A source of D.C. potential, represented by the battery 4, is connected by the two lines 5 and 6 to the two electrodes 1 and 2, respectively, and a switch 7 serves to control the application of this potential to the electrodes.

Figure 2:
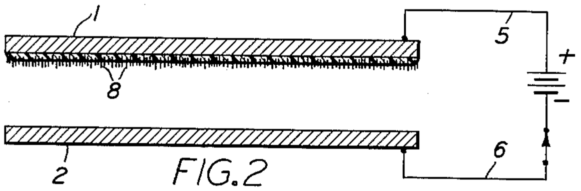
Figure 2 is a similar illustration showing a second step in the method.

A quantity of photo-sensitive particles, indicated generally by the reference numeral 8, is spread over the upper surface of the electrode 2 while the switch 7 is open. Generally, these particles 8 may be considered as non-conductors or, on the other hand, conductors having fairly high resistance. This being true, the moment the switch 7 is closed, an electro-static field between the electrodes 1 and 2 will be developed which will tend to orient the particles 8 into alignment with the field lines and will propel the particles toward electrode 1. These particles will enter the sticky film 3 as illustrated by Figure 2.

More specifically, and by way of example, the potential of the battery 4 may be ten kilovolts, the spacing between the two electrodes one inch, the thickness of the sticky film 3 approximately 20 mils, the size of the electrodes 1 and 2 approximately two inches across, and the size of the particles 8, 0.5 to 2 millimeters in length and one-tenth to two-tenth millimeter in thickness. The particles 8 may consist of cadmium sulphide crystals prepared according to a method attributed to R. Frericks. Such a method is commonly known to persons skilled in the art and is described in Physical Review, volume 72, 1947, on page 594. Generally, these crystals are produced by evaporation of metallic cadmium in an atmosphere of hydrogen sulphide and hydrogen. They are predominantly of an elongated shape and are adaptable to the purposes of this invention as will become apparent from the following.

Figure 3:
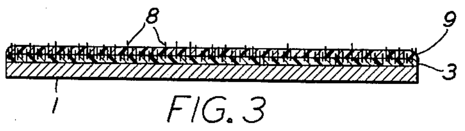
Figure 3 is a similar illustration showing another step.

After the particles 8 have been embedded into the sticky film 3, the film is dried so as to secure the particles in position. As a next step (see Figure 3), electrode 1 is disconnected from the circuit line 5 and treated by flowing a liquid binder 9 of insulating material to a suitable thickness over the surface of the film 3. This binder should be an insulating material which is somewhat viscous but sufficiently fluid to fill the interstices between adjacent crystals 8. A molten wax or plastic, preferably of the type which will harden at room temperatures, is used as the binder, since heating of the assembly tends to impair the sensitivity of the crystals.

After the film 9 has completely solidified, end portions of the majority of crystals 8 will project beyond the surface of the film, and must, therefore, be removed. Any suitable process for removing these end portions may be used, but preferably, they are shaved off by means of a sharp instrument, such as a surgeon's scalpel or razor blade. Thereafter, this surface of the film 9 may be lightly ground to provide a plane surface.

The assembly comprising the layers 3 and 9 is now peeled from the electrode 1, and if necessary, the underside of the film 3 is lightly ground until the ends of the crystals 8 are reached.

Figure 7:
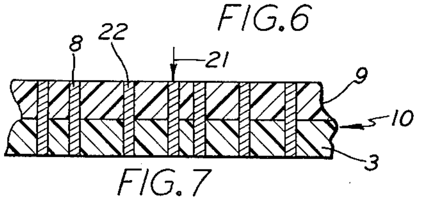
Figure 7 is a fragmentary cross-section of a photo-conductive lamina constructed in accordance with the principles of this invention.

A sheet-like, photo-conductive layer 3, 9 having parallel plane faces is now provided, and such an element, indicated by the reference numeral 10, is shown as being sandwiched in an assembly comprising an upper, transparent glass plate 11, a transparent film 12 of metal applied to one side of the plate 11, the photo-conductive layer 10 mounted on the metal electrode 12, a film 13 of electro-luminescent material applied on the layer 10, another thin, transparent metallic electrode 14 in contact with the layer 13, and another glass plate 15 mounted on the metallic electrode 14. This assembly is disclosed in more detail and claimed in the aforementioned Orthuber application Serial No. 332,733. The photo-conductive layer 10 is shown in more detail in enlarged form in Figure 7. It will be noted that the individual crystals 8 are spaced apart by the film and binder material 3 and 9, respectively, and by proper selection of these materials 3 and 9, the individual crystals will be suitably electrically insulated from each other. The importance of this feature will be explained more fully in the following.

Figure 5:
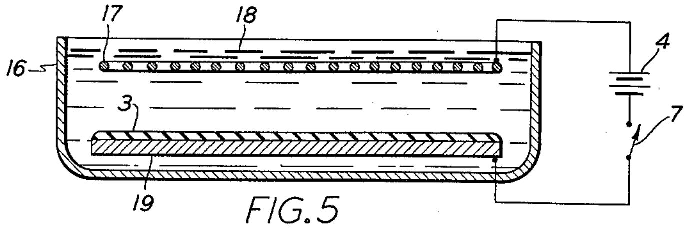
Figure 5 is an illustration of a step in an alternative method of this invention.
Figure 6:
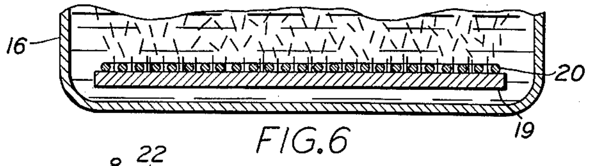
Figure 6 is a fragmental illustration of a step in a still further embodiment of this invention.

Alternative methods of preparing the photo-conductive layer 10 are illustrated by Figures 5 and 6, respectively. In Figure 5, a container 16 is filled with a suitable liquid, insulating material, such as paraffin oil, and a perforated screen 17 is immersed in this liquid and positioned adjacent the upper liquid surface 18. This screen 17 may be of any desired mesh size, but as an example, may be 200 mesh and comprised of crossed strands of copper wire.

Another electrode 19 similar to the electrodes 1 and 2 is positioned adjacent the bottom of container 16 parallel to screen 17. A film 3 of sticky substance is applied to the upper side of the electrode 19 just prior to immersion, and the usual conducting circuit serves to couple the source of potential 4 to the two electrodes 17 and 19, respectively.

Cadmium sulphide crystals, such as the ones described previously, are distributed over the surface 18 of the liquid adjacent the upper surface of the screen 17. These crystals will slowly filter through the perforations of the screen, and will move toward the electrode 19 upon closure of the circuit switch 7. The electro-static field set up between the two electrodes 17 and 19 will orient the elongated crystals in a direction normal to the surface of the electrode 19 so that the lower ends of the respective crystals will be embedded into the sticky film 3. After the film 3 has become completely covered with crystals, the electrode 19 is removed from the container 16, rinsed, and treated in the same manner as explained in connection with the preceding method. Crystals which cannot enter the film may be cleaned away easily by the rinsing step. Also, it has been found that these excess crystals may be dislodged by inverting and tapping the plate 19 lightly.

In Figure 6, the same container 16 filled with the same liquid as in the case of Figure 5 may be utilized. Instead of the electrode assembly 3, 19 of Figure 5, a slightly different arrangement is used. A screen of from 100 to 200 mesh size and indicated by the reference numeral 20 is superimposed upon the electrode 19. A sticky substance such as that used in the preceding embodiments to form the film 3 is provided underneath the screen 20. Now, as the electrostatic field is applied between the electrode assembly 19, 20 and the upper electrode 17 (not shown in this figure), the individual crystals will enter the openings in the screen 20 and be adhered thereinto by the sticky substance. By means of this arrangement, predetermined spacing between individual crystals may be obtained, and such consistent spacing is of importance in achieving certain operational characteristics as will become apparent from the following explanation. The crystals oriented in the openings of the screen 20 are secured in place by use of the binder material as explained in connection with preceding embodiments, and if desired, the screen 20 may either remain in the assembly for use in the screen of Figure 4 or may be peeled off. The opposite surfaces of the layer may be ground to provide true, parallel surfaces.

In designing a light-amplifying screen such as the one illustrated by Figure 4, three essential requirements must be met if it is desired to reproduce a reasonably satisfactory optical image. First, the dark-resistance of the photo-sensitive layer 10 should be high so that the voltage-drop appearing across the electro-luminescent layer 13 of Figure 4 is small enough to prevent glow during the periods and in the area where no illumination is applied to the photo-sensitive layer 10. As explained in the Orthuber application Serial No. 332,733, and in the preamble of this application, the light-amplifying screen may be compared with a conventional, parallel plate condenser, the dielectric material in this condenser comprising the two series connected layers 10 and 13, respectively. The dielectric characteristics of these two layers 10 and 13 being different, the division of voltages across these two layers will correspond thereto. Since the resistance of the photo-conductive layer 10 changes upon illumination, the distribution of voltages across the two dielectric layers 10 and 13, respectively, will correspondingly change. Therefore, in order to prevent lighting or glowing of the electro-luminescent layer 13 during periods of "no-light" on the layer 10, it is necessary that the layer 10 have a relatively high dark-resistance. This is achieved by making the layer 10 of sufficient thickness that the resistance thereacross will be considerable in the absence of light.

As a second requirement, the capacity of the photo-conductive layer must be small as compared to the capacity of the electro-luminescent layer of equal thickness. When this is true, the capacitive reactance of the layer 10 is considerably greater than that of the layer 13 thereby providing the desired distribution of exciting voltage across the layer 13. As a third requirement, the crystals 8 must be so arranged in the layer 10 that excitation of an elemental area of the layer 10 will produce excitation of the electro-luminescent layer 13 in a corresponding elemental area in direct registry therewith. In order to accomplish this feature, it is necessary that lateral conduction in the layer 10 be substantially suppressed. This suppression is achieved by using individual crystals in the layer 10, which are separated by spaces of insulation which prevent objectionable conduction from one crystal to another. Thus, if a pin point ray of light, indicated by the reference numeral 21 in Figure 7, were projected only upon the upper end of the particular crystal 22, the impedance of crystal 22 only will be effected thereby confining the variation in voltage distribution applied to the electro-luminescent layer 13 to that area immediately adjacent the lower end of the crystal 22.

It will now be apparent that in order to achieve a faithful reproduction of an optical image by the electro-luminescent layer 13, the variation in exciting potential applied across the layer 13 must correspond identically to the variations in the optical image projected on the upper side of the layer 10, as illustrated in Figure 4. If the layer 10 should be non-uniform in its thickness from one side to the other, the pattern of the voltage distribution applied to the surfaced layer 13 would be correspondingly non-uniform which would result in impaired reproduction of the image. Therefore, it is important that the layer 10 be of uniform physical thickness (or uniform electric characteristics) throughout its extent and also be fairly homogeneous in composition.

The present invention is superior to anything heretofore known, since preparation of photo-conductive layers of sufficient thickness for use in the light-amplifying screen of this invention, are extremely difficult to obtain by use of known techniques of evaporating layers of the photoconductive material. When evaporation methods are used, the individual layers tend to peel from the adjacent layers.

While there has been described what is at present considered the preferred embodiment of the invention, it will be obvious to those skilled in the art that various changes and modifications may be made therein without departing from the invention, and it is, therefore, intended in the appended claims to cover all such changes and modifications as fall within the true spirit and scope of the invention.

What is claimed is:

1. The method of making a sheet-like photoconductive member by the use of an electrostatic field applied between two electrodes comprising the steps of applying a uniform film of sticky substance to a surface disposed between said electrodes, introducing a quantity of elongated radiation-sensitive cadmium sulphide crystals of predetermined size into the space between said electrodes, applying said electrostatic field between said electrodes for aligning said particles in a direction substantially normal to the plane of said film and for causing said crystals to embed in said film, spacing said crystals apart prior to embedding in said film and thereafter securing said crystals in position by means of a binder of insulating material.

2. The method of making a sheet-like photoconductive member by the use of an electrostatic field applied between two electrodes, one of said electrodes having a surface, comprising the steps of applying a uniform film of sticky substance to said surface of said one electrode, introducing a quantity of elongated radiation-sensitive cadmium sulphide crystals of predetermined size into the space between said electrodes, applying said electrostatic field between said electrodes for aligning said particles in a direction substantially normal to the plane of said film and for causing said crystals to embed in said film, spacing said crystals, substantially uniformly from each other as they enter said film, and thereafter filling the spaces between the exposed ends of said crystals with an insulating material.

3. The method of making a sheet-like photoconductive member by the use of an electrostatic field applied between two parallel spaced planar electrodes comprising the steps of applying a uniform film of a sticky substance to one inner surface of one electrode, covering this film of sticky substance with a sheet-like element having a plurality of perforations which are substantially uniformly spaced apart, immersing said electrodes in a liquid insulating material, introducing a quantity of elongated radiation-sensitive cadmium sulphide crystals of predetermined size into the space between said electrodes, applying said electrostatic field between said electrodes for aligning said particles in a direction substantially normal to the plane of said film and for causing said crystals to enter endwise said film only through said perforations, and securing said crystals in position.

4. The method of making a sheet-like photoconductive member by the use of an electrostatic field applied between two parallel spaced planar electrodes, one of said electrodes being a perforate screen of desired mesh size, comprising the steps of mounting a perforate sheet-like screen on the other of said electrodes, applying a film of sticky substance underneath said sheet-like screen, immersing said electrodes in a liquid insulating material, introducing a quantity of elongated radiation-sensitive cadmium sulphide crystals of predetermined size into said liquid on the side of said screen electrode opposite the other electrode, applying an electrostatic field between said electrodes, said crystals passing through the openings in said screen electrode and being aligned parallel in the direction of the other electrode, said field serving to propel said crystals toward said other electrode whereby said crystals enter respective perforations of said sheet-like screen to become embedded in said film, and thereafter securing said embedded crystals in position.

References Cited in the file of this patent

UNITED STATES PATENTS

| | | |
|---|---|---|
| 1,854,071 | Schacht | Apr. 12, 1932 |
| 1,935,649 | McCreary | Nov. 21, 1933 |
| 2,169,840 | Lewis et al. | Aug. 15, 1939 |
| 2,189,340 | Donal | Feb. 6, 1940 |
| 2,233,941 | Fix | Mar. 4, 1941 |
| 2,238,381 | Batchelor | Apr. 15, 1941 |
| 2,262,123 | Sukumlyn | Nov. 11, 1941 |
| 2,434,931 | Johnson | Jan. 27, 1948 |
| 2,548,872 | Cross | Apr. 17, 1951 |
| 2,650,191 | Teal | Aug. 25, 1953 |
| 2,650,310 | White | Aug. 25, 1953 |

FOREIGN PATENTS

| | | |
|---|---|---|
| 188,030 | Great Britain | Oct. 23, 1922 |